Patented Aug. 26, 1941

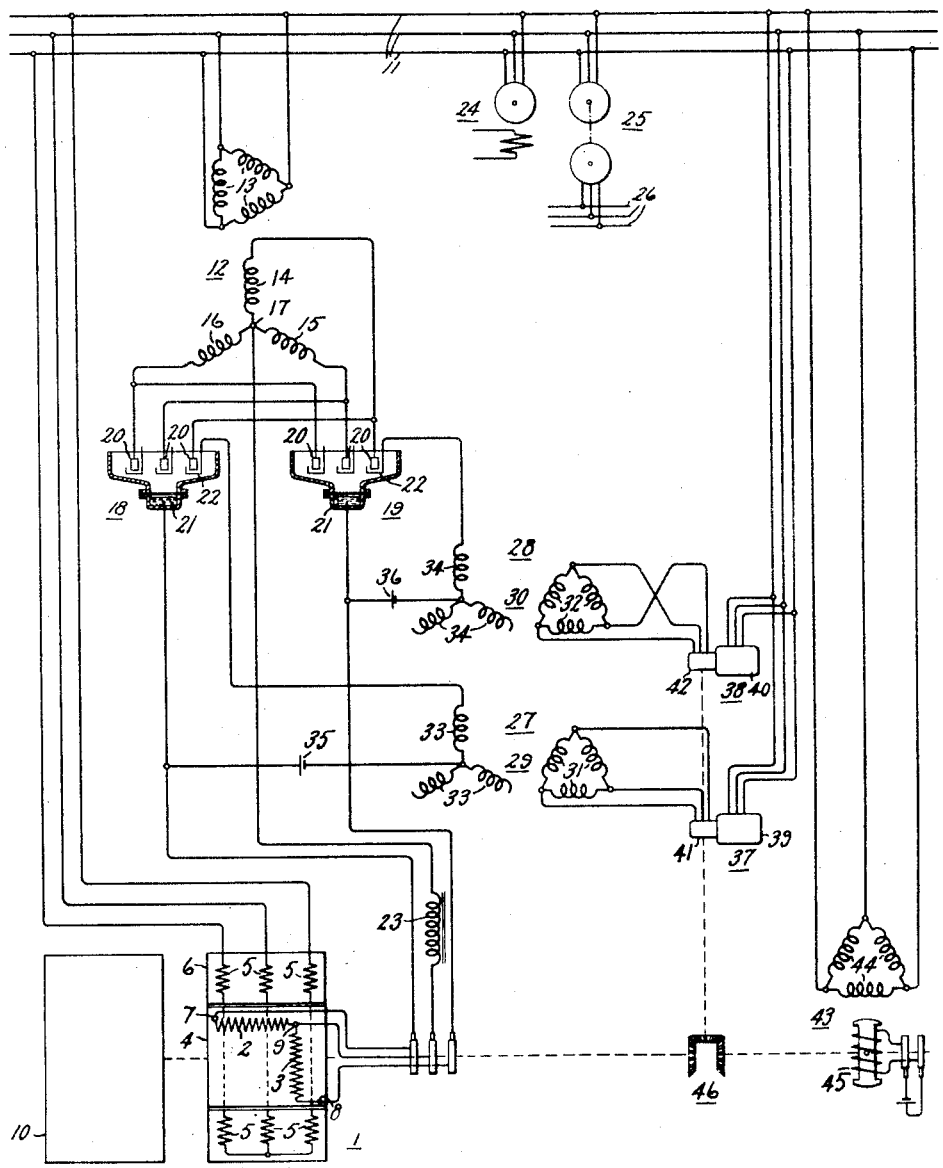

2,253,982

UNITED STATES PATENT OFFICE 2,253,982

ELECTRIC VALVE TRANSLATING APPARATUS

Heinz Puppe, deceased, late of Berlin-Reinickendorf, Germany, by William A. Dodge, administrator, Schenectady, N. Y., assignor to General Electric Company, a corporation of New York Original application June 20, 1939, Serial No. 280,084. Divided and this application November 26, 1940, Serial No. 367,206. In Germany July 12, 1938

3 Claims. (Cl. 171—97)

This invention relates to electric valve systems and more particularly to electric valve apparatus for energizing a plurality of load circuits.

This application is a division of a copending patent application Serial No. 280,084, filed June 20, 1939, and which is assigned to the assignee of the present application.

It is an object of this invention to provide new and improved electric valve translating apparatus.

It is another object of this invention to provide new and improved electric valve translating apparatus for energizing a plurality of direct current load circuits wherein different amounts of current may be transmitted to each of the load circuits.

Briefly stated, in accordance with the illustrated embodiments of the invention there is provided an improved electric valve circuit for transmitting different amounts of current to a plurality of direct current load circuits from an associated alternating current supply circuit.

For a better understanding of the invention, reference may be had to the following description taken in connection with the accompanying drawing, and its scope will be pointed out in the appended claims. Referring to the drawing, Fig. 1 diagrammatically illustrates an embodiment of the invention as applied to an alternating current dynamo-electric machine which may be operated either as a motor or as a generator, and Fig. 2 represents certain operating characteristics thereof.

Referring now to Fig. 1 of the drawing, the invention is shown as applied to a system for controlling an alternating current dynamo-electric machine 1 of the synchronous type and which may operate either as a motor or as a generator. The dynamo-electric machine 1 comprises relatively movable armature and field structures, one of which comprises a pair of windings having the axes thereof mechanically displaced in order to produce a resultant magnetic field adjustable in space. In the particular embodiment of the invention shown in Fig. 1, a pair of field windings 2 and 3 are represented as being a part of a rotating field structure 4 and the armature windings 5 are shown as part of a stationary structure 6. It is to be understood that the reverse arrangement of windings could be effected; that is, the field windings 2 and 3 could be mounted on the stationary structure and the polyphase armature windings 5 could be distributed on the rotating structure 4 in a manner well understood by those skilled in the art. Field windings 2 and 3 are provided with terminal connections 7 and 8, respectively, and are also provided with a common connection 9.

The dynamo-electric machine 1 may operate either as a motor or as a generator. When machine 1 is operating as a motor, it may drive a suitable load which is represented by the element 10. When the machine 1 is operating as a generator, the element 10 may be considered as representing a driving motor or a prime mover.

There is provided a translating circuit for variably energizing the field windings 2 and 3 to control the angular position of the rotating structure or rotor 4 of the machine 1 in response to the angular displacement between, or the deviation of the angular velocity of the rotor from a vector representing a predetermined electrical condition such as the voltage of an associated alternating current circuit 11. The translating system includes a transformer 12 having a plurality of primary windings 13 connected to the polyphase alternating current circuit 11, and includes a plurality of electrically displaced secondary phase windings 14, 15 and 16 which constitute an inductive network and which have an electrical neutral connection 17. There is also provided a pair of electric valve means 18 and 19, each of which includes a plurality of principal electrodes of one polarity and an electrically common principal electrode of different polarity. In the specific embodiment of the invention illustrated, the principal electrodes are shown as being a plurality of anodes 20 and a single associated cathode 21. Of course, it is to be understood that there may be employed a plurality of electric valve means in which the common or single principal electrode is formed by a plurality of connected anodes and a plurality of individual cathodes at different potentials. Each of the electric valve means 18 and 19 is provided with a plurality of control members 22 which control the conductivities of the associated electric discharge paths and hence control the amount of current transmitted to field windings 2 and 3, respectively. The electric valve means 18 and 19 are arranged with respect to the secondary windings 14—16 so that corresponding anodes of the electric valve means 18 and 19 are connected to the same secondary winding. The common connection 9 of the field windings 2 and 3 is connected to the neutral connection 17 of the secondary windings 14—16 through a suitable smoothing inductance 23.

The polyphase alternating current circuit 11 may be connected to other synchronous apparatus, such as an alternating current motor or generator 24, or may be connected to an alternating current frequency changing set 25 for transmitting power between the alternating current circuit 11 and an alternating current circuit 26.

Means for controlling the conductivities of the electric valve means 18 and 19 is provided to transmit different amounts of unidirectional current to the field windings 2 and 3 to maintain the angular relationship or angular displacement of the rotor 4 of machine 1 at a substantially constant value with respect to a predetermined electrical condition, such as the voltage, of the alternating current circuit 11. As a means for controlling the electric valve means 18 and 19, excitation circuits 27 and 28 are provided which impress suitable control voltages on control members 22. The excitation circuits 27 and 28 may include transformers 29 and 30, having primary windings 31 and 32 and secondary windings 33 and 34, respectively. The secondary windings 33 and 34 are connected to control members 22 of electric valve means 18 and 19, respectively. Suitable sources of negative unidirectional biasing potential, such as batteries 35 and 36, may be connected to the neutral connection of the secondary windings 33 and 34.

Each of the excitation circuits 27 and 28 comprises a suitable controlling means for varying the voltage impressed on the control members 22 to increase the conductivity of one of the electric valve means and to decrease the conductivity of the other electric valve means in response to deviations in the angular velocity of the rotor 4 of machine 1 with respect to a predetermined electrical condition of circuit 11 or with respect to a condition of motor 24 or the frequency changing set 25. These controlling means may be phase shifting devices, such as rotary phase shifters 37 and 38, which control the phase relationship of the voltages impressed on the control members 22 with respect to the voltages impressed on the associated anodes 20 of electric valve means 18 and 19. The rotary phase shifters 37 and 38 comprise stators 39 and 40 and rotating members 41 and 42. The rotors and stator members of the rotary phase shifters 37 and 38 may be of the distributed type.

To control the conductivities of the electric valve means 18 and 19 in accordance with the deviation in angular velocity or in accordance with the angular displacement between the rotor 4 and a predetermined electrical condition, such as the voltage of circuit 11, means is provided for rotating the rotors 41 and 42 of the phase shifters 37 and 38 in a manner to increase the conductivity of one of the electric valve means and to decrease the conductivity of the other electric valve means in response to changes in the angular displacement. Furthermore, means are employed which will reverse the direction of change of the conductivities of the electric valve means 18 and 19 for opposite direction of change in angular displacement of the rotor 4. In the embodiment illustrated, the invention is shown as comprising an auxiliary or pilot alternating current motor 43 of the synchronous type comprising armature windings 44 and a field winding 45. The motor 43 is employed to provide an electrical reference quantity which rotates at a substantially constant angular velocity, irrespective of variations in the voltage of the alternating current circuit 11. There is also provided a suitable differential means, such as a planetary differential gear system 46, which operates the rotors 41 and 42 in response to the difference between the angular velocity of the rotor 4 of machine 1 and the angular velocity of the pilot motor 43.

The feature of employing the present system for variably energizing a pair of field windings for a synchronous machine to control the angular displacement between the field magnetomotive force and the armature voltage of the machine, or the voltage of an associated alternating current circuit, is disclosed and claimed in the above-identified application of which this application is a division.

The operation of the embodiment of the invention shown in Fig. 1 of the drawing will be explained by considering the system when the machine 1 is operating as a synchronous generator driven by the prime mover 10. The control system shown in Fig. 1 will operate to maintain a predetermined constant angular displacement between the rotor 4 and the voltage of the alternating current circuit 11, or between the output voltages of the motor or generator 24 or the frequency changer set 25. Variable amounts of unidirectional current are transmitted to the field windings 2 and 3 to control the magnitude and angular displacement of the resultant magnetic field to maintain a constant angle between the rotor 4 and the vector representing the voltage of circuit 11. It is well understood by those skilled in the art that the average output current of an electric valve means of the controlled type increases as the voltage impressed on the control members is advanced to a point of substantial phase coincidence with the applied anode-cathode voltage, and that the average output voltage is decreased as the phase displacement between these voltages is progressively retarded. The electric valve means 18 and 19, by virtue of the associated excitation circuits 27 and 28, are arranged to be controlled in opposite directions; that is, as the conductivity of one of the electric valve means is increased, the conductivity of the other electric valve means is decreased. This control in the relative conductivities in the electric valve means is obtained by the manner in which the rotors of the electric valve means 41 and 42 of the phase shifters 37 and 38 control the voltages impressed on the control members 22.

The system shown in Fig. 1 responds under varying load conditions to maintain the angular displacement between the rotor 4 and the vector representing the voltage of circuit 11 at a substantially constant or fixed value. The manner in which this control is effected may be more fully understood by referring to Fig. 2 where windings 2 and 3 are shown as being associated with associated salient pole core structures, and in which the vectors OA and OB represent the axes along which the magnetomotive forces provided by these windings act. Vectors OC, OD and vectors OE, OF represent the magnetomotive forces acting along axes OA and OB, respectively, under different variable energizations of the windings 2 and 3.

It will be understood that the vector representing the resultant magnetic field produced by the windings 2 and 3 may be rotated throughout the quadrant lying within vectors OA and OB. For example, the resultant magnetic field may assume the angular displacements represented by vectors OH, OJ and OK, depending upon the magnitudes of the magnetomotive forces acting along axes OA and OB. For example, if the average output current of one electric valve means is zero, as for example, if the output of electric valve means 19 is zero, reducing the resultant direct current supplied to field winding 3 to zero, the resultant magnetic field lies along axis OA. If the average output current of electric valve means 19 is increased to the amount corresponding to vector OE, the vector OH represents the resultant magnetic field. It will be noted that in this last instance the magnetomotive force acting along the axis OA has been reduced to an amount corresponding to vector OD. In this manner, the energizations of field windings 2 and 3 are varied to control the phase of the resultant magnetic field to maintain a predetermined constant angular displacement between the rotor 4 and the voltage of circuit 11.

Another important advantage of the embodiment of the invention described above is the ability of the system to absorb transient voltages which may be present in the system. Furthermore, the system responds to effect rapid change in the resultant magnetic field of the machine 1, under transient load conditions, by transmitting energy from the field windings 2 and 3 to the alternating current circuit 11. Of course, under such conditions, the electric valve means 18 and 19 operate as inverters.

While the invention has been shown and described as applied to a particular system of connections and as embodying various devices diagrammatically shown, it will be obvious to those skilled in the art that changes and modifications may be made without departing from the invention, and it is, therefore, the aim in the appended claims to cover all such changes and modifications as fall within the true spirit and scope of the invention.

What is claimed as new and is desired to be secured by Letters Patent of the United States is:

1. In combination, an alternating current circuit, a pair of direct current circuits having a common connection and each having a terminal connection, means for energizing said direct current circuits comprising a plurality of windings having a neutral connection and a pair of electric valve means each having a plurality of principal electrodes of one polarity and a principal electrode of a different polarity, corresponding principal electrodes of said one polarity of the respective electric valve means being connected to the same winding of said plurality of windings, means for connecting each of the principal electrodes of different polarity to a different one of said terminal connections of said direct current circuits, and means for controlling the conductivities of said electric valve means to transmit different amounts of current to said load circuits.

2. In combination, an alternating current circuit, a pair of direct current circuits having a common connection, means for energizing said direct current circuits comprising a plurality of windings having a neutral connection and a pair of electric valve means each having a plurality of anodes and an electrically common cathode, means for connecting each of said cathodes to a different one of said load circuits, corresponding anodes of the respective electric valve means being connected to the same winding of said plurality of windings, and means for controlling the conductivities of said electric valve means to transmit different amounts of current to said load circuit.

3. In combination, an alternating current supply circuit, a pair of direct current load circuits having a common connection and a pair of terminal connections, means for energizing said load circuits from said supply circuit and comprising an inductive network including a plurality of phase windings having a neutral terminal connected to said common connection of said load circuits, a pair of electric valve means each having a plurality of anodes, an electrically common cathode and a plurality of control members, said cathodes each being connected to a different one of the terminal connections of said load circuits, and means for energizing said control members to transmit different amounts of current to said load circuits.

WILLIAM A. DODGE.
*Administrator of the Estate of Heinz Puppe, Deceased.*